United States Patent [19]

Whitlock

[11] Patent Number: 4,535,023

[45] Date of Patent: Aug. 13, 1985

[54] PROCESS FOR FABRICATING CRYOGENIC TARGETS AND TARGETS MADE THEREBY

[75] Inventor: Robert R. Whitlock, College Park, Md.

[73] Assignee: The United States of America as represented by the Secretary of the Navy, Washington, D.C.

[21] Appl. No.: 500,724

[22] Filed: Jun. 3, 1983

[51] Int. Cl.³ ............... B32B 3/10; B05D 5/00; B05D 1/32

[52] U.S. Cl. .................... 428/195; 372/39; 427/160; 427/237; 427/248.1; 427/272

[58] Field of Search ............ 372/5, 39, 66; 427/272, 427/99, 160, 237, 248.1; 428/195

[56] References Cited

U.S. PATENT DOCUMENTS 3,914,446  10/1975  Ohkuma .................. 427/101
4,039,698   8/1977  Fraser et al. ............ 427/99 X

OTHER PUBLICATIONS

Hawley, G. G., *The Condensed Chemical Dictionary,* Ninth Edition, New York, Van Nostrand Reinhold Co., 1977, pp. 35, 691, 692.

*Primary Examiner*—Evan K. Lawrence
*Attorney, Agent, or Firm*—Robert F. Beers; William T. Ellis; Alan P. Klein

[57] ABSTRACT

A process for patterning a target for lasing at X-ray wavelengths from materials which cannot be readily shaped. A substrate of one material is placed in a gaseous atmosphere of another material, and the substrate is cooled below the freezing point of the other material so that a frozen layer of the other material condenses onto the substrate. Part of the frozen layer of the other material is masked, and the unmasked part of the frozen layer is vaporized so that the substrate of the one material is coated with the other material according to the pattern of the mask. The target made by the process is also disclosed.

19 Claims, 16 Drawing Figures

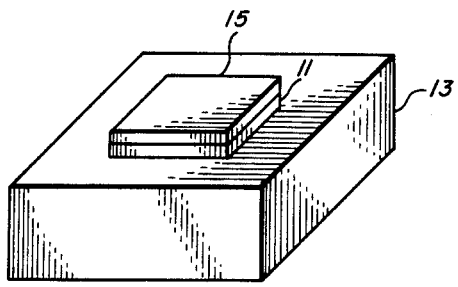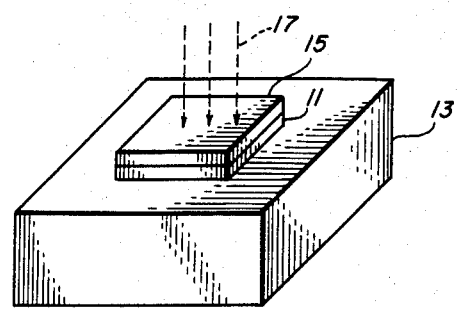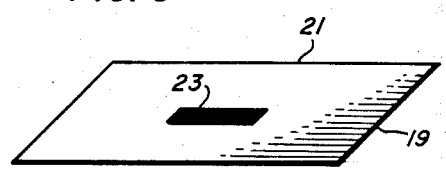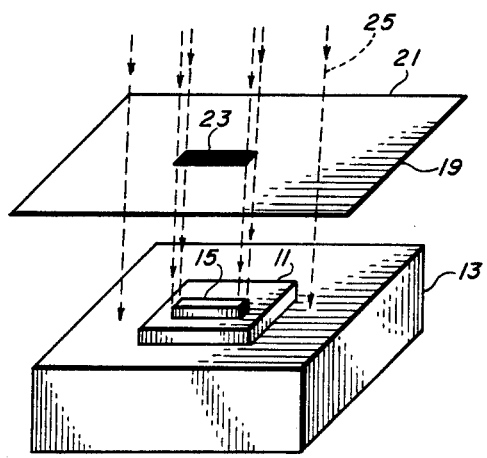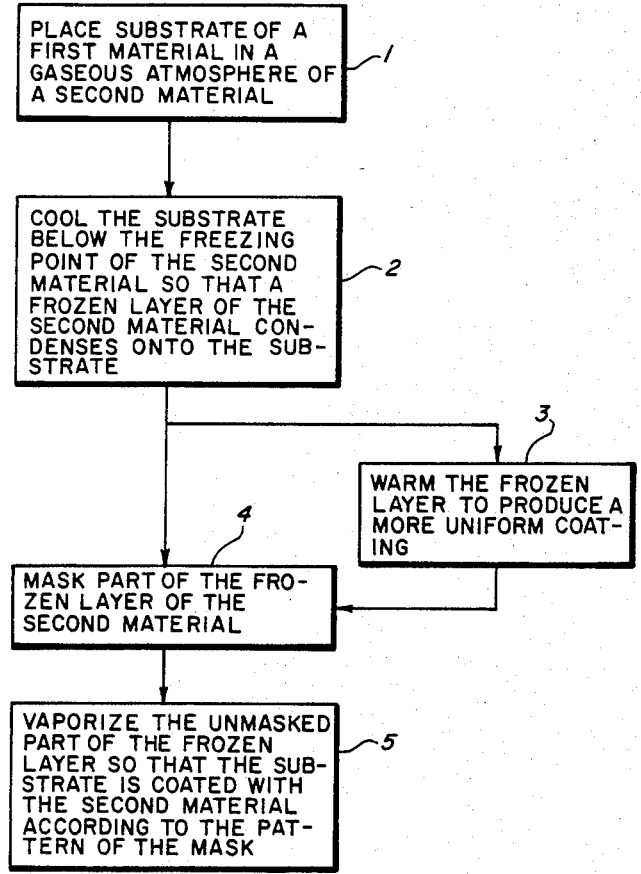

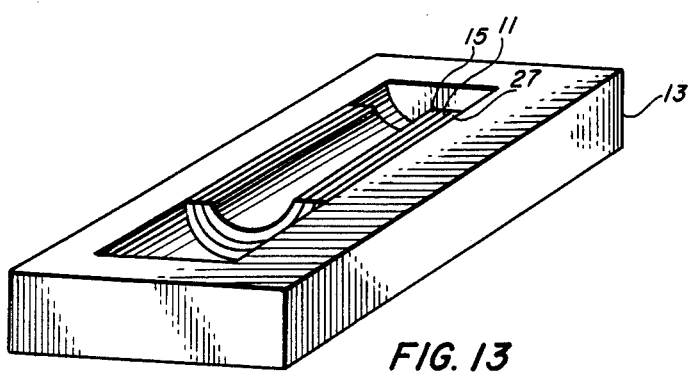
FIG. 13
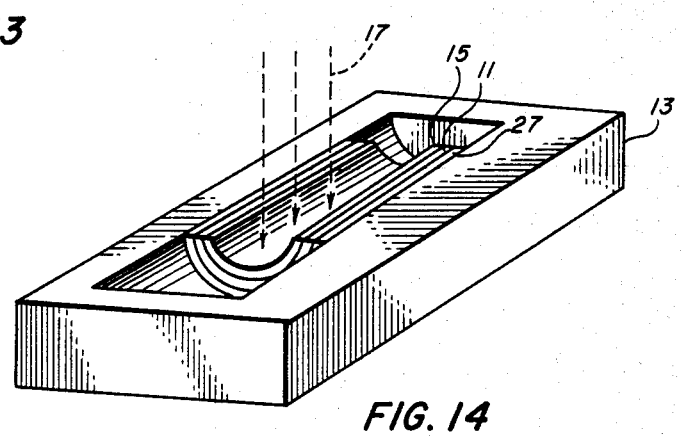
FIG. 14
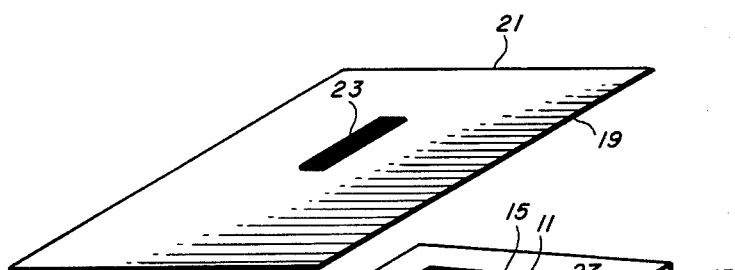
FIG. 15
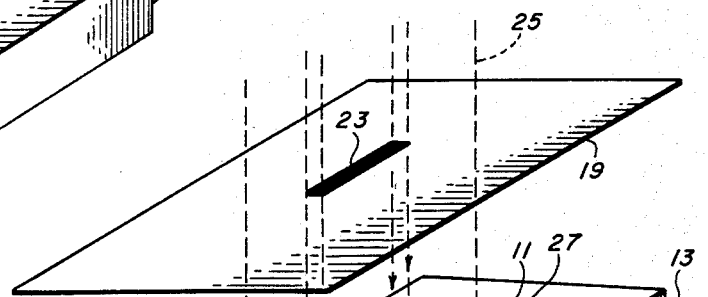
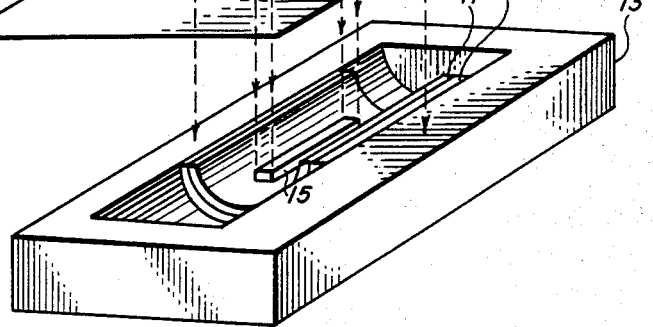
FIG. 16

PROCESS FOR FABRICATING CRYOGENIC TARGETS AND TARGETS MADE THEREBY

BACKGROUND OF THE INVENTION

The present invention relates generally to coating processes, and more particularly to such processes used for fabricating targets.

The attainment of lasing action at shorter and shorter wavelengths has been an on-going field of research with many articipated applications.

The traditional laser consists of an active medium pumped in some manner to produce an inverted population between two states, and inserted between mirrors which form an optical resonant cavity. A later discovery showed that intense emission could be obtained from systems without optical cavities. These high-gain mirrorless systems have been appropriately termed amplified spontaneous emission (ASE) systems. ASE systems are of major importance in shortwavelength lasers such as X-ray lasers. To produce gain in ASE systems, high inversion densities are called for and very rapidly rising pump pulses are required to achieve inversion and gain prior to equilibration.

One source given serious consideration for pumping X-ray transitions is laser beams, particularly the very short pulsewidth, mode-locked picosecond beams. By mode-locking, $Nd^{+3}$ laser beams can be made to have pulsewidths of $10^{-12}$ seconds and they can be focused to small volumes with high irradiance. However, the photon energy is too small to pump X-ray transitions directly, so the high-power laser pulse must be used to vaporize and heat a pump material to generate plasma X-rays which in turn fall onto a nearby lasing material and optically pump the latter's energy levels to inverted populations.

Because of the importance of gain-per-unit length, the lasing material should have a large length-to-width or aspect ratio. One target configuration satisfying this requirement consists of a stripe of lasing material overcoating a matrix of pump material. Unfortunately, some materials of interest cannot be obtained in this geometry by conventional means such as evaporating, milling, coating, etc. because of their high vapor pressure. A specific example is the neon-sodium system in which the Na X $1s^2$-1s $2p^1P$ line at 11.00 Angstroms is used to optically pump the Ne IX 1s-1s $4p^1P$ line at 11.001 Angstroms creating an inversion primarily in the $n=3$ and $n=2$ levels of Ne IX, and a stimulated emission at 82 Angstroms. Because of the noble gas behavior of neon, it cannot be fabricated by known methods, into the above geometry for lasing action to take place.

SUMMARY OF THE INVENTION

It is therefore an object of this invention to fabricate materials into a target geometry suitable for lasing action at X-ray wavelengths.

Another object is to cryogenically fabricate such materials using pattern definition of the lasing or pump material.

These and other objects of the invention are achieved by a process for patterning a target for lasing at X-ray wavelengths from materials which cannot be readily shaped. A substrate of one material is placed in gaseous atmosphere of another material, and the substrate is cooled below the freezing point of the other material so that a frozen layer of the other material condenses onto the substrate. Part of the frozen layer of the other material is masked, and the unmasked part of the frozen layer is vaporized so that the substrate of the one material is coated with the other material according to the pattern of the mask.

In another aspect, the invention involves a target formed in accordance with this process.

An advantage of the invention is that materials with desirable spectroscopic properties but undesirable chemical and physical properties can now be fabricated into the desired geometries. The availability of a cryogenic fabrication technique which involves pattern definition of the lasing (or pump) material is new to the field of short wavelength lasers, as is the availability of a process to fabricate Na/Ne targets with a large aspect ratio.

Additional advantages and features will become apparent as the subject invention becomes better understood by reference to the following detailed description when considered in conjunction with the accompanying drawings wherein:

BRIEF DESCRIPTION OF THE DRAWING

FIGS. 1 to 5 show the structural changes following various steps in the fabrication of a target in accordance with a first embodiment of the invention.

FIG. 6 is a flow chart of the principal fabrication steps in accordance with the invention.

FIGS. 12 to 16 show the structural changes following various steps in the fabrication of a target in accordance with another modification of the invention.

DESCRIPTION OF THE PREFERRED EMBODIMENTS

Figure 7:
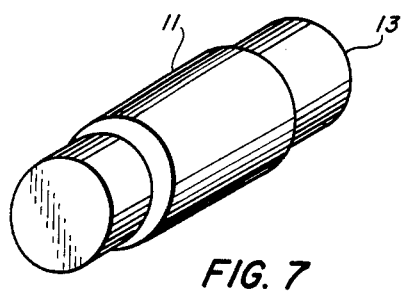
FIGS. 7 to 11 show the structural changes following various steps in the fabrication of a target in accordance with one modification of the invention.
Figure 8:
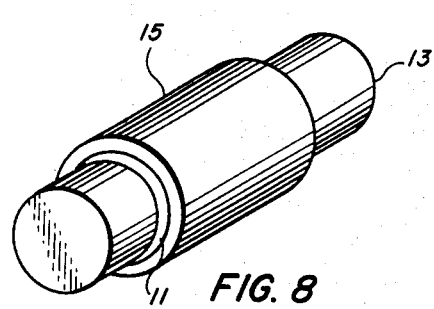
Figure 9:
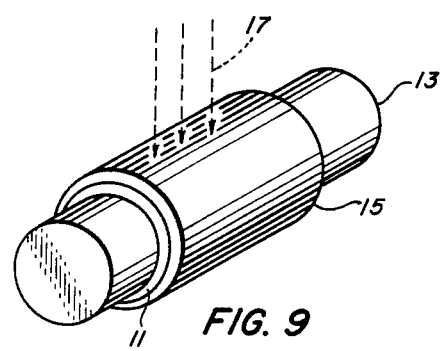
Figure 10:
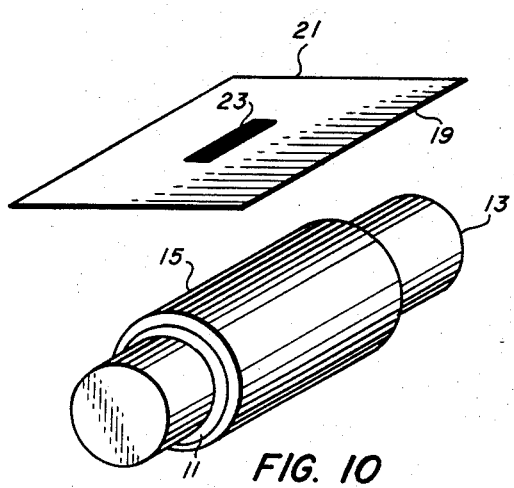
Figure 11:
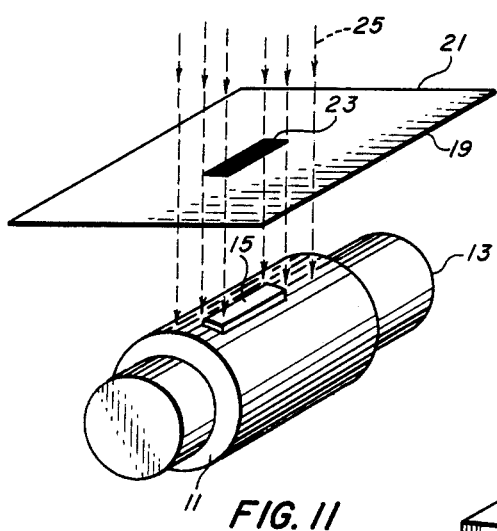

An illustrative embodiment of the invention can be described with concurrent reference being made to the flow chart of FIG. 6 and to the schematic structures of FIGS. 1–5. The latter figures depict the sequential structural changes in illustrative targets after each principal step in the inventive process is completed.

The method of patterning a target, for lasing at X-ray wavelengths, from materials which cannot be readily shaped, includes a first step 1 as shown in FIG. 1 wherein a substrate 11 of a first material, which may be a pump material such as sodium, is placed in a gaseous atmosphere of a second material, which may be a lasing material such as the noble gas neon. In step 2 as shown in FIG. 2, the substrate 11 is cooled by a conventional cryogenic cooler 13 below the freezing point of the second material so that a frozen layer 15 of the second material is formed on the substrate 11. An optional step 3, as shown in FIG. 3, is directed to warming the frozen layer 15 with warming rays 17 to produce a more uniform coating. In step 4, as shown in FIG. 4, part of the frozen layer 15 is masked by a mask 19 having a transparent area 21 and an opaque area 23. Finally, step 5 is performed, as shown in FIG. 5, whereby the unmasked part of the frozen layer 15 is vaporized by warming rays 25 so that the substrate 11 of the first material is coated with the second material 15 according to the pattern of the mask 19. Step 5 may be accomplished, for example, by illuminating the mask 19 with light. In order to vaporize the unmasked part of the frozen layer 15, enough of the atmosphere of the second material must be removed first so that the outgassing rate of the second material exceeds its condensation rate.

In the case of a target made according to the method of this invention by overcoating a stripe of neon on a substrate of sodium, suitable dimensions for the neon stripe when the target is intended to be driven into the plasma state by a pulsed Nd driver are as follows:

thickness—0.1 to 20 micrometers
length—1000 micrometers
width—1/10 of the length The thicknesses recited are typical of burn depths of materials for such a driver, and the length is typical of a focal spot obtainable with a high power laser. A long length is desirable. The width is set by aspect ratio considerations. A large aspect ratio is desirable.

When the optical depth of the pumping radiation in the lasing material is less than the width of the lasing material, it becomes advantageous to layer the pump and lasing material by alternate coatings of thickness determined by the emissivity of the pump material, the optical depth of the lasing material, and the burn depth of the driver.

MODIFICATIONS

Reference is now made to the process depicted in FIGS. 7-11 which is similar to the process described above. The difference in the process of FIGS. 7-11 is that the substrate 11 is in the form of a cylinder instead of a rectangular solid.

Figure 12:
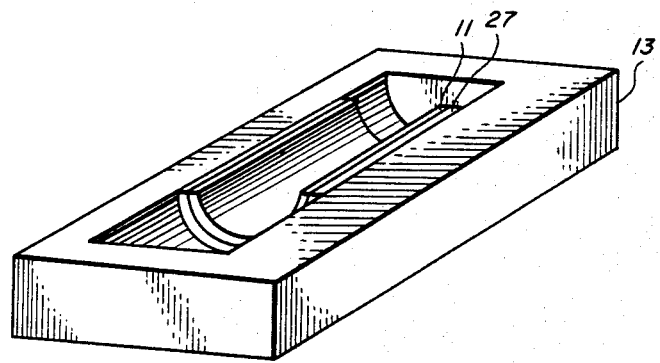

Reference is also made to the process depicted in FIGS. 12-16. The difference in the process of FIGS. 12-16 is that the substrate 11 is in the form of a cylindrical shell and the frozen layer condenses on the inner surface of the cylindrical shell in step 2. It may be convenient to interpose a mandrel 27 between the substrate 11 and the cryogenic cooler 13 as shown in FIG. 12. It is to be understood that two open cylindrical shells as shown in FIG. 15 may be brought together to form a completely closed cylindrical tube. Further, one may start with a closed cylindrical shell in step 1 provided the first material and the mandrel are transparent to the warming rays in step 3 and step 5.

The cylindrical geometries in the above modifications provide greater control over the density, temperature and energy-balance regimes to which the lasing material may be brought.

It is obvious that many other modifications and variations of the present invention are possible in light of the above teachings. For example, the second material, which is cryogenically deposited, need not be a noble or elemental gas. Other gases, such as oxygen, nitrogen, etc., may be used to produce a suitable coating, either singly or in combination. Also, other patterns may be determined to be advantageous, such as alternating stripes of pump and pumped material, or a mesh or checker board pattern, etc. The first material need not be a pure element, and can be other than sodium. The mask may be either positive or negative, i.e., may either mostly transparent or mostly opaque. The first material can be a non-active (neither pump nor lasing) material, while the second material can be a simultaneous mixture of pump and lasing materials. In this case, the process is used for coating and for pattern definition. The second material and the first material may be overlaid with a third material, which may be identical to the first material or not, so that the second material is driven into the plasma state by the driver at a particular moment in the driver pulse. It is therefore to be understood that within the scope of the appended claims, the invention may be practiced otherwise than as described.

What is claimed as new and desired to be secured by Letters Patent of the United States is:

1. A process of patterning a target, for lasing at X-ray wavelengths, from materials which cannot be readily shaped, comprising the steps of:
    (a) placing a substrate of one material in a gaseous atmosphere of another material;
    (b) ensuring that the substrate is below the freezing point of the other material so that a frozen layer of the other material condenses onto the substrate;
    (c) masking part of the frozen layer of the other material; and
    (d) vaporizing the unmasked part of the frozen layer so that the substrate of the one material is coated with the other material according to the pattern of the mask.

2. The process recited in claim 1 wherein:
the substrate is cooled cryogenically in step (b).

3. The process recited in claim 2 wherein:
the other material is a lasing material.

4. The process recited in claim 3 wherein:
the one material is a pump material.

5. The process recited in claim 4 wherein:
the other material is a noble gas.

6. The process recited in claim 5 wherein:
the other material is neon.

7. The process recited in claim 1 wherein:
the substrate is in the form of a cylinder.

8. The process recited in claim 1 wherein:
the substrate is in the form of a cylindrical shell and the frozen layer condenses on the inner surface of the cylindrical shell in step (b).

9. A process of patterning a target, from sodium and neon, for lasing at X-ray wavelengths, comprising the steps of:
    (a) placing a substrate of sodium in a gaseous atmosphere of neon;
    (b) cryogenically ensuring that the substrate is below the freezing point of neon so that a frozen layer of neon condenses onto the substrate;
    (c) masking part of the frozen layer of neon; and
    (d) vaporizing the unmasked part of the frozen layer so that the substrate of sodium is coated with neon according to the pattern of the mask.

10. The process recited in claim 9 wherein:
a stripe of the frozen layer is masked in step (c).

11. The process recited in claim 10 wherein step (d) includes:
removing enough of the atmosphere of neon that the outgassing rate of neon is greater than its condensation rate.

12. The process recited in claim 11 including the step of:
warming the frozen layer to produce a more uniform coating prior to step (c) and after step (b).

13. A process of patterning a target, from sodium and neon, for lasing at X-ray wavelengths, comprising the steps of:
    (a) placing a substrate of sodium in a gaseous atmosphere of neon;
    (b) cryogenically ensuring that the substrate is below the freezing point of neon so that a frozen layer of neon condenses onto the substrate;
    (c) warming the frozen layer of neon to produce a more uniform coating;
    (d) masking a stripe of the frozen layer of neon; and (e) vaporizing the unmasked part of the frozen layer by illuminating it with light so that the substrate of sodium is coated with neon according to the pattern of the mask;

wherein step (e) includes removing enough of the atmosphere of neon that the outgassing rate of neon is greater than its condensation rate.

14. The target formed in accordance with the process recited in claim 1, wherein:

the one material is a pump material, and the other material is neon.

15. The target recited in claim 14 wherein:
the one material is sodium.

16. The target recited in claim 15 wherein:
the masked part of the frozen layer of neon is a stripe.

17. The target recited in claim 16 wherein:
the stripe has a thickness of from 0.1 to 20 micrometers.

18. The target recited in claim 17 wherein:
the stripe has a width 1/10 of its length.

19. The target recited in claim 18 wherein:
the stripe is 1000 micrometers long.

* * * * *